United States Patent [19]

Odd

[11] Patent Number: 4,629,772

[45] Date of Patent: Dec. 16, 1986

[54] METHOD OF POLYMERIZING VINYL CHLORIDE

[75] Inventor: Bjerke Odd, Sundsvall, Sweden

[73] Assignee: Norsk Hydro A.S., Oslo, Norway

[21] Appl. No.: 715,265

[22] Filed: Mar. 25, 1985

Related U.S. Application Data

[63] Continuation of Ser. No. 213,247, Dec. 5, 1980, abandoned.

[30] Foreign Application Priority Data

Dec. 6, 1979 [SE] Sweden .................................. 7910079

[51] Int. Cl.$^4$ ................................................ C08F 2/22
[52] U.S. Cl. .................................. 526/201; 526/207; 526/344.2
[58] Field of Search ........................................ 526/201

[56] References Cited

U.S. PATENT DOCUMENTS

| | | | |
|---|---|---|---|
| 3,324,097 | 6/1967 | Pears | 526/207 |
| 3,678,021 | 7/1972 | Chatelain | 526/201 |
| 3,714,097 | 1/1973 | Cautilli | 526/201 |
| 3,725,367 | 4/1973 | Kemp | 526/201 |
| 4,093,581 | 6/1978 | Anderson | 526/201 |

FOREIGN PATENT DOCUMENTS 0003905  9/1979  European Pat. Off. .

*Primary Examiner*—Christopher Henderson
*Attorney, Agent, or Firm*—Fred Philpitt

[57] ABSTRACT

The present invention comprises a method of preparing vinyl chloride polymers or vinyl chloride copolymers suitable for the preparation of plastisols. The method can be used at polymerizations, wherein a pre-emulsion of a substance having a very low solubility in water, is caused to swell by the vinyl chloride monomer, whereafter the monomer emulsion obtained is subjected to polymerizing conditions. According to the invention the emulsion is stabilized, and, by polymerizing in the presence of an stabilizing latex, it is possible to avoid, that the obtained latex becomes instable. In this way it is possible to prepare polymers having a particle size and a particle size distribution giving a product with low viscosity at the preparation of plastisols.

8 Claims, No Drawings

METHOD OF POLYMERIZING VINYL CHLORIDE

This is a continuation of application Ser. No. 213,247, filed Dec. 5, 1980, now abandoned, and the benefits of 35 USC 120 are claimed relative to it.

The present invention relates to a method of polymerizing vinyl chloride. According to the method a polymerizate suitable for the preparation of plastisols can be obtained.

Vinyl chloride polymers in the shape of small particles, usually within the range of 0.1 to $2\mu$, form stable dispersions together with plasicizers for the polymers. These dispersions are usually called plastisols. The plastisols can be used for many purposes and they can for example be used in mould casting or centrifugal casting, dipping or coating, and in the preparation of foamed products. After being applied the plastisol is heated, whereby the polymers gel.

In these applications, in order to obtain good results, the rheological properties, especially the stability and the viscosity of the plastisols, are very critical. In the first place the size and the size distribution of the particles determine these properties. Thus, with fine-grained polymers, too high plastisol viscosity is obtained, whereas the plastisol turns unstable and the polymer settles, if the polymer particles are too large. Within the field of plastisol technology, polymers giving low plastisol viscosity are desired implying that methods giving polymers with optimal particle size and range of particle size are aimed at. It is for example known, that a polymerizate having comparatively large particles and narrow particle size distribution gives low viscosity values but such values can also be obtained with a polymerizate having two different fractions of particle sizes. Thus, by changing the morphology of the polymer, the appearance of polymer particle and in that connection the methods of preparing the polymers, there are different possibilities of exerting influence on the plastisol viscosity.

Polymers suitable for the preparation of plastisols can be prepared by conventional emulsion polymerization, where the monomer is dispersed in water together with an emulsifier to a droplet size in the range of 10 to $30\mu$. These droplets act as a monomer reservoir and the polymerization takes place in the aqueous phase by means of a water-soluble free radical forming initiator. Detrimental to this method is that the polymer formed frequently has a very small particle size entailing a too high viscosity of the plastisols prepared from these polymers. In order to avoid this, polymers from two different polymerizations are often mixed. This method can be modified by accomplishing the emulsion polymerization in the presence of a seed latex. Then the main part of the monomers will be polymerized to the seed particles and new formation of polymer particles will be suppressed by controlling the amount of emulsifier and batchwise addition of the monomers. Such a process is for example disclosed in the U.S. Pat. No. 2 520 959.

Polymers suitable for the preparation of plastisols may also be prepared by polymerization in a fine disperse system by using a monomer soluble initiator. According to this process, a mixture of monomers, water and emulsifier is homogenized for the preparation of monomer droplets containing initiator with a droplet size ranging between 0.1 and $2\mu$. As the polymerization takes place within the droplets, the polymers will also have a size within this range, and, by selecting conditions for the homogenization, it is consequently also possible to select the final particle size of the polymer. Such a process is disclosed in the U.S. Pat. No. 3 373 150. A disadvantage inherent to this process is, that the whole amount of the monomer and water must be subjected to homogenization conditions.

This disadvantage can be avoided by using a polymerization process disclosed in the British Pat. No. 1 527 312. According to this process, a pre-emulsion is first formed of water, emulsifier and a substance, that is a solvent for the vinyl chloride and that also has a very low solubility in water. To this pre-emulsion is then added the vinyl chloride that diffuses through the aqueous phase and that is absorbed by droplets of the emulgated substance having a very low solubility in water. By then these droplets swell and because of the large area of the droplets swelled, and the absence of emulsifier in the aqueous phase, the polymerization will take place in the droplets in spite of the fact that a water-soluble initiator is used.

This process can be modified by making the substance having a very low solubility in water swell a seed latex, preferably by treating the latex with the substance having a very low solubility in water in the presence of a solent before the monomers are added and the polymerization is started. A process of this type is disclosed in the Norwegian patent application No. 7800596.

Thus, also by using these methods, the particle size of the final polymer can be controlled by selection of conditions for the formation of the pre-emulsion of water, emulsifier and the substance having a low solubility in water. The emulsion is preferably prepared by homogenizing in the same way as when polymerizing in a fine disperse system. It is sufficient to homogenize only a minor part of the water amount that is to be present at the final polymerization and, besides, it is not necessary at all to homogenize the monomers by using these methods.

However, using this method for the polymerization of vinyl chloride will lead to stability problems with the emulsion of the monomers and the water during the polymerization step. After the addition of the monomers, the emulsion becomes so instable, that it coagulates during the polymerization step, if the droplet size of the homogenized substance having a very low solubility in water is adjusted within the interval that is desirable, if a polymerizate having good plastisol forming properties is required. This means that it is necessary to decrease the droplet size, leading to a particle size of the polymer obtained, giving plastisols having too high viscosity.

According to the present invention, there is provided a method of improving the stability of the emulsion of the monomer swelled substance having a very low solubility in water by adding a stabilizing latex to the system before or during the polymerization step.

The presence of the stabilizing latex entails that the pre-emulsion of the substance having a very low solubility in water can be prepared with such sizes of the droplets, that the final polymer will have a particle size allowing the preparation of plastisols having good rheological properties and, above all, low initial viscosity, when the plastisol is stored.

Accordingly, the present invention relates to a method of polymerizing vinyl chloride or a mixture of vinyl chloride and up to 20 percent by weight, based on the vinyl chloride, of copolymerizable monomers, by homogenizing in water a substance having a very low solubility in water, an emulsifier and water, after which the monomers are added to form an emulsion of monomers in water and this emulsion is then polymerized in the presence of a free radical forming initiator, the polymerization step being carried out in the presence of a stabilizing polymer latex.

It is essential that the stabilizing latex consists of a polymer having a molecular weight exceeding 15,000 and preferably within the range of 40,000–300,000. Lower molecular weights make the latex swell too much in the presence of monomers and such excessive swelling exerts a negative influence on the stabilizing power of the latex or the droplets of the substance having a low solubility in water, which droplets have been swelled by the monomers.

It is also essential that the polymer latex and the pre-emulsion of the substance having a very low solubility in water are mixed under such conditions, that the substance has no possibility to swell the polymer latex to any appreciable extent. This is preferably accomplished by having the main part of the amount of water present at the addition of latex or pre-emulsion to the system. If the latex and the pre-emulsion are mixed before the main part of the water is added, the residence time for this mixture should not exceed 60 minutes, preferably not 30 minutes.

The size of the particles of the stabilizing latex should be within the range 0.01 to 0.5$\mu$. Polymers prepared in the presence of a stabilizing latex having particles within the range of 0.02 to 0.2$\mu$, preferably 0.03 to 0.08$\mu$, give the best stabilizing power and the best plastisol viscosity. The latex can be present from the beginning of the polymerization, but it can also be added after some conversion. If the latex is added after a conversion of 80%, preferably 75%, worse stabilizing properties will be obtained. It has also been found, that a larger size of the particles, suitably within the range of 0.03 to 0.4$\mu$ and preferably within the range of 0.08 to 0.25$\mu$ is necessary, in order to obtain sufficient stability of the monomer dispersion, if the latex is added during the later part of the conversion.

The amount of latex used according to the present process may vary within broad limits and, usually, the amount of latex is within the interval of 0.03 to 30 percent by weight, calculated as polymer in the latex, of the total amount of monomer. When present from the beginning of the polymerization, the amount of latex, calculated as stated above, preferably is 0.05 to 10 percent by weight, and most preferably 0.1 to 3 percent by weight. When added during the polymerization step, the amount of latex should be within the interval of 0.1 to 30 percent by weight, and larger amounts are used the longer the conversion has taken place.

The stabilizing latex consists of a polymer or a copolymer copolymerizable with vinyl chloride. As the amounts of the latex usually are comparatively small, the final vinyl polymer is affected by the polymer in the latex only to a negligable extent. Examples of suitably polymers for the seed latex are homopolymers or copolymers of styrene, vinyl chloride, vinyl acetate, vinylidene chloride, lower acrylates or methacrylates having up to 6 carbon atoms in the alkyl part. Advantageously a seed latex of vinyl chloride or copolymerizates of vinyl chloride, containing up to 20 percent by weight, based on the vinyl chloride, of copolymerizable monomers is used. The latex is preferably prepared by emulsion polymerization according to known recipes, but it may also be prepared by polymerization in a homogenized system with an initiator, which is soluble in the monomers, or by polymerization of a homogenized substance having a very low solubility in water and being swelled by the monomers.

When preparing the pre-emulsion of the substance having a very low solubility in water, the emulsifier and water known methods and known chemicals can be used as disclosed in e.g. the British Pat. No. 1 527 312.

Thus, the substance having a very low solubility in water, whould have a solubility below $10^{-2}$ g/l, preferably $10^{-3}$ g/l, and most preferably $10^{-4}$ g/l, at 25° C., and moreover, the substance should be a solvent for the vinyl chloride and optional comonomers. Examples of suitable substances are straight or branched aliphatic hydrocarbons having ar least 10, preferably 15 to 30 carbon atoms, such as alkanes or alkenes, which may optionally be halogenated.

It may also be advantgeous to use a substance having a low solubility, which substance can have an influence on the properties of the final polymer, e.g. plasticizers, such as phosphates, adipates or phthalates having the solubility indicated above, e.g. dioctyl phthalate. Other examplees of substances having an influence on the final polymer are copolymerizable monomers, such as vinyl ethers, vinyl esters or acrylates or mixtures thereof.

When homogenizing the substance having a low solubility in water, the emulsifier and the water, the mixture of these components is subjected to shearing forces in known devices, such as gap homogenizers, colloid mills or ultrasonic homogenizers. By controlling the homogenization conditions the droplet size of the dispersed substance having a low solubility in water is adjusted, so that the final polymer obtains a particle size within the interval giving the desired properties at the preparation of the plastisol. Normally, the particle size of the dispersed substance (d) can be calculated from the formula $$d = D \cdot \left( \frac{1.4 \cdot v}{p \cdot o} \right)^{\frac{1}{3}},$$

wherein D is the average particle size of final polymer latex, p is the monomer added, expressed in grams, o is the conversion degree at the polymerization and v is the volume of the substance having a low solubility in water.

In the preparation of the pre-emulsion at least 0.5 percent by weight of the total amount of water, that is to be present at the polymerization, should be present. Suitably 0.5–15 percent by weight, and preferably 1–5 percent by weight of the total amount of water, is used at the polymerization. However, the process is not limited to these amounts of water, the whole amount of the water constituting the upper limit. The latter limit does, however, require unnecessarily large dimensions of the homogenizing equipment.

Any known emulsifier or mixture of emulsifiers may be used at the polymerization of the vinyl chloride. Examples of suitable emulsifiers are ammonium salts or alkali metal salts of fatty acids, alkyl or alkylaryl sulfonic acids, alkyl sulphates, alkyl ethers sulphates, alkyl sulphosuccinates, wherein the alkyl chains preferably have 6–20 carbon atoms. Also cationic or non-ionic emulsifiers may be used, such as ethylene oxide adducts of fatty alcohols or alkyl aryl phenols, such as nonyl phenol having 6-20 ethylene oxide adducts. The amount of emulsifier may preferably vary within the interval of 0.2-5 percent by weight, based on the monomer, preferably 0.5-2 percent by weight.

As free radical forming initiator there are used water-soluble compounds, such as inorganic or organic peroxides, e.g. ammonium or alkali metal persulphate, hydrogen peroxide, butyl hydroperoxide, cumyl hydroperoxide, methyl ethyl ketone hydroperoxide or cyclohexanone hydroperoxide. Naturally, also redox systems can be used, as well as initiators, which are soluble both in the monomer and in water, such as lower alkyl peroxide dicarbonates, e.g. diethyl peroxide dicarbonate, diisopropyl peroxide dicarbonate, di-sec.butyl peroxide dicarbonate or azo-bis-lower alkyl nitrile, e.g. azo-bis-isobutylonitrile. Plastisols prepared from polymers, for which organic, water-soluble initiators are used, give especially low viscosity properties, and, for that reason, water soluble initiators are preferred. The amount of initiator varies within the interval of 0.01-1 percent by weight, preferably 0.02-0.2 percent by weight, based in the amount of monomers. Preferably, the initiator is added after the homogenizing step, but it may also be present during the homogenization, if suitable protective measures are taken. It is also conceivable to carry out the polymerization with an additional amount of monomers soluble initiator, e.g. alkyl peroxides or alkyl peroxide dicarbonates having 8-20 carbon atoms in the alkyl chains. In such cases the monomer soluble initiator is added before the homogenization.

Examples of suitable comonomers, that can take part in the polymerization in an amount of up to 20 percent by weight, based on the vinyl chloride, are vinyl acetate, alkyl acrylates or methacrylates, alkenes having 2-5 carbon atoms, vinyl ethers, vinylidene chloride, styrene or acrylonitrile. If complying with the demands stated above concerning the low solubility in water, such monomers may be present at the homogenization.

A monomer water ratio of 1:2-1:0.5, preferably 1:1.3-1:0.8, is suitably used in the polymerization. The polymerization temperature should vary within an interval of 25°-80° C., preferably 40°-75° C. The polymer latex obtained may be processed in known manner, e.g. by precipitating or spray drying, possibly after the stripping of the monomer involving e.g. heating to a temperature of about 60°-95° C., optionally at reduced pressure.

The invention is disclosed in greater detail by the following illustrative examples, which are not, however, intended to restrict the invention. Parts and percentages given in the examples refer to parts by weight and percent by weight, if not stated otherwise.

EXAMPLE 1

A mixture of aliphatic hydrocarbons having an average chain length of 16 carbon atoms was homogenized with water and an emulsifier in a valve homogenizer to a pre-emulsion with an average droplet size of $0.3\mu$. The following recipe was used:

| | |
|---|---|
| A mixture of hydrocarbons | 10 parts |
| Water | 19.5 parts |
| Sodium lauryl sulphate | 0.5 parts |

The following components were added to a polymerizing reactor:

| | |
|---|---|
| Water | 1000 parts |
| Pre-emulsion as stated above | 30 parts |
| Sodium lauryl sulphate | 6 parts |
| Vinyl chloride | 900 parts |
| Potassium persulphate | 1.6 parts |
| Ammonia was added to pH 8-9 | |

Water, emulsifier and pre-emulsion were added to the reactor and the mixture was heated to 50° C. The air in the reactor was removed by evacuation, and then an aqueous solution of vinyl chloride and persulphate was added. The stirring was continued at 50° C., until the pressure was reduced to 0.5 MPa. Non-reacted monomer was removed by blowing. When the autoclave was opened, it was found, that the latex had coagulated to a mass similar to whipped cream. When having this consistency, the product cannot be dried in a rational way, but represents a loss.

EXAMPLE 2

The experiment according to example 1 was repeated, except that a latex of poly(vinyl chloride) was added before the vinyl chloride was added. The latex had an average size of $0.06\mu$ and was added in an amount corresponding to 3 g poly(vinyl chloride) per liter aqueous phase at the polymerization. In this case, at the polymerization, a normal latex was obtained, which latex had a dry content of 45%, and this latex could be processed by spray drying in known manner. The spray-dried product was ground in a pin mill and a plastisol was prepared of the ground product, which plastisol consisted of 100 parts of polymer and 50 parts of dioctyl phthalate. The plastisol had a viscosity of 30 Pas at 300 $s^{-1}$ according to Hake.

EXAMPLE 3

The process according to example 2 was repeated, but 0.33 parts methyl ethyl ketonehydroperoxide was substituted for the potassium persulphate. Also in this case a stable latex was obtained after the completion of the polymerization, which latex was dried by spray-drying. The plastisol viscosity obtained according to the conditions stated in example 2 was 20 Pas.

EXAMPLE 4

A pre-emulsion was prepared as stated in example 1, but vinyl stearate was used as the substance having a low solubility in water, and sodium dodecyl benzene sulphonic acid was used as emulsifier.

To 40 parts of this pre-emulsion were added 1000 parts of water, 6 parts of sodium dodecyl benzene sulphonate, 900 parts of vinyl chloride, 0.45 parts of cyclohexanone peroxide and a poly(vinyl chloride) latex having a particle size of $0.060\mu$ in an amount corresponding to 3 g polymer per liter aqueous phase. After the polymerization was completed, 2 parts of ethoxylated nonyl phenol (about 9 ethoxy groups) were added, and after this the latex was heated to 85° C. for stripping off the remaining amounts of monomer during 30 minutes. After cooling and spray-drying a resin was obtained, which, after grinding, was mixed with 50 percent dioctyl phthalate. The viscosity of the plastisol, measured as above, was 17 Pas.

EXAMPLE 5

A pre-emulsion was prepared by homogenizing 10 parts of dioctyl phtalate, 39 parts of water and 1 part of ammonium laurate so that an emulsion having a droplet size of 0.33µ, was obtained.

50 parts of this pre-emulsion was added to 1000 parts of water, 4 parts of ammonium laurate, 1.6 parts of potassium persulfate, 900 parts of vinyl chloride and a poly(vinyl chloride) latex having an average particle size of 0.032µ in an amount corresponding to 3 g polymer per liter aqueous phase. A stable latex was obtained after the polymerization was completed.

EXAMPLE 6

A pre-emulsion was prepared as disclosed in example 1 and a series of polymerizations were carried out, as stated in the example, and also in the presence of a stabilizing poly(vinyl chloride) latex having an average particle size of 0.057µ. At the experiments, the latex was added in an amount of 0.3, 1.0, 30 and 60 g polymer per liter aqueous phase, respectively. All the polymerizations gave stable latices having no tendency to coagulate.

EXAMPLE 7

To 30 parts of a pre-emulsion prepared according to example 1 but with sodium alkyl sulphonate with an alkyl group having an average chain length of 15 carbon atoms, as emulsifier, were added 1000 parts of water, 6 parts of sodium lauryl sulphate, 900 parts of vinyl chloride, 0.33 parts of methyl ethyl ketone hydroperoxide and a polystyrene latex having a particle size of 0.050µ in an amount of 5 g polymer per liter aqueous phase. The polymer latex obtained after completion of polymerization did not show any tendency to coagulate, it was spray-dried and a plastisol prepared of the polymerizate obtained (in the same way as stated above) had a viscosity of 22 Pas.

EXAMPLE 8

The process according to example 3 was repeated, but a mixture of vinyl chloride and vinyl acetate, having a ratio of 9:1, was used instead of the vinyl chloride. After completion of the polymerization a stable latex was obtained, and a plastisol, prepared of the isolated polymerizable, had the viscosity of 30 Pas.

EXAMPLE 9

30 parts of a pre-emulsion, prepared as disclosed in example 1, were added to a reactor, containing 1000 parts of water and 6 parts of sodium lauryl ether sulphate. The temperature was raised to 50° C., and the air in the reactor was removed by evacuating. Thereafter 900 parts of vinyl chloride and 0.45 parts of cyclohexanone hydroperoxide were added, and the polymerization was started. after about 6 hours, corresponding to a conversion of about 70%, a latex having an average particle size of 0.12µ, was added in an amount of 100 g polymer per liter. When the polymerization was completed, a stable latex was obtained,

EXAMPLE 10

A pre-emulsion was prepared as disclosed in example 1 and a series of polymerizations were carried out according to the process disclosed in that example and also in the presence of 3 g, calculated as polymer per liter aqueous phase, of different stabilizing poly(vinyl chloride) latices having average particle sizes of 0.020µ, 0.032µ, 0.043µ, 0.055µ, 0.098µ, 0.15µ and 0.33µ, resepctively. All the polymerizations resulted in stable latices having no tendency to coagulate.

I claim:

1. In the polymerization of vinyl chloride or vinyl chloride and up to 20 percent by weight, based on the vinyl chloride, of a copolymerizable monomer, the improvement which comprises providing a stable monomer emulsion during the polymerization by
    (a) preparing a pre-emulsion in water of droplets of a substance that is a solvent for vinyl chloride and has a very low water solubility by homogenizing a mixture of water, an emulsifier and said substance,
    (b) adding vinyl chloride or vinyl chloride and up to 20 percent by weight, based on the vinyl chloride, of co-polymerizable monomer in order to swell said droplets
    (c) subjecting the emulsion of monomer-swollen droplets and water to polymerizing conditions in the presence of a free radical forming initiator,
    (d) said polymerization being carried out in the presence of 0.03–30% by weight of added polymer latex in order to stabilize said emulsion during the polymerization,
    (e) said added polymer latex being added before the conversion has reached 80%, and
    (f) said added polymer latex being introduced under such conditions that the pre-emulsion of step (a) has no possibility of swelling the added polymer latex to any substantial extent.

2. A method according to claim 1 wherein said polymer latex has a particle size within the range of 0.03–0.08µ.

3. A method according to claim 1 wherein the free radical forming initiator consists of a water-soluble organic initiator.

4. A method according to claim 1 wherein said added latex has a molecular weight exceeding 15,000.

5. The method according to claim 1 wherein said added latex has a molecular weight of 40,000–300,000.

6. The method according to claim 1 wherein the amount of said added latex is 0.05–10% by weight.

7. The method according to claim 1 wherein the amount of said added latex is 0.1–3% by weight.

8. A process according to claim 1 wherein water is added in step (b).

* * * * *

UNITED STATES PATENT AND TRADEMARK OFFICE
CERTIFICATE OF CORRECTION

PATENT NO. : 4,629,772
DATED : December 16, 1986
INVENTOR(S) : Odd Bjerke

It is certified that error appears in the above-identified patent and that said Letters Patent is hereby corrected as shown below:

On the title page, Item /19/ "Odd" should read -- Bjerke --.

Item /75/ should read -- Odd Bjerke --.

Signed and Sealed this

Seventeenth Day of March, 1987

Attest:

DONALD J. QUIGG

Attesting Officer

Commissioner of Patents and Trademarks